United States Patent
Marlowe

(10) Patent No.: US 11,887,043 B2
(45) Date of Patent: Jan. 30, 2024

(54) SYSTEMS AND METHODS FOR ELECTRONICALLY ANALYZING AND NORMALIZING A SHIPPING PARAMETER BASED ON USER PREFERENCE DATA

(71) Applicant: Acuitive Solutions, LLC, Charlotte, NC (US)

(72) Inventor: Phillip Marlowe, Weddington, NC (US)

(73) Assignee: Acuitive Solutions, LLC, Charlotte, NC (US)

(*) Notice: Subject to any disclaimer, the term of this patent is extended or adjusted under 35 U.S.C. 154(b) by 592 days.

(21) Appl. No.: 16/923,561

(22) Filed: Jul. 8, 2020

(65) Prior Publication Data
US 2021/0012285 A1 Jan. 14, 2021

Related U.S. Application Data

(60) Provisional application No. 62/872,755, filed on Jul. 11, 2019.

(51) Int. Cl.
*G06Q 10/0834* (2023.01)
*G06Q 30/0201* (2023.01)

(52) U.S. Cl.
CPC ... *G06Q 10/08345* (2013.01); *G06Q 30/0201* (2013.01)

(58) Field of Classification Search
CPC .............. G06Q 10/08345; G06Q 30/0201
See application file for complete search history.

(56) References Cited

U.S. PATENT DOCUMENTS

| 2016/0189102 A1* | 6/2016 | Schreiber | G06Q 10/047 705/338 |
| 2016/0300277 A1* | 10/2016 | Marlowe | G06Q 10/083 |
| 2018/0150797 A1* | 5/2018 | Coyle | G06Q 10/08355 |
| 2018/0165642 A1* | 6/2018 | Krieg | G06F 9/451 |

OTHER PUBLICATIONS

FreightRun, LTL Freight Quote Calculator, (Mar. 6, 2019), <https://www.freightrun.com/rate/freight-quote> (Year: 2019).*

* cited by examiner

*Primary Examiner* — Shannon S Campbell
*Assistant Examiner* — Manal A. Alsamiri
(74) *Attorney, Agent, or Firm* — Kilpatrick Townsend & Stockton LLP

(57) ABSTRACT

One example of the present disclosure can include a system that can receive a first data set over a network from a first computing device, the first data set indicating user preference data and a first request for a shipping cost. The system can also receive a second data set over the network from the second computing device, the second data set indicating a first shipping cost generated by a shipping entity associated with the second computing device in response to the second request. Based on receiving the second data set, the system can determine a second shipping cost based on the user preference data and the first shipping cost. The system can then transmit the second shipping cost over the network to the first computing device, for example as part of a graphical user interface for display on the first computing device.

20 Claims, 4 Drawing Sheets

SYSTEMS AND METHODS FOR ELECTRONICALLY ANALYZING AND NORMALIZING A SHIPPING PARAMETER BASED ON USER PREFERENCE DATA

CROSS-REFERENCE TO RELATED APPLICATION

This application claims priority to U.S. Provisional Patent Application No. 62/872,755, entitled "SYSTEMS AND METHODS FOR ELECTRONICALLY ANALYZING AND NORMALIZING A SHIPPING PARAMETER BASED ON USER PREFERENCE DATA," filed Jul. 11, 2019, the entirety of which is hereby incorporated by reference.

TECHNICAL FIELD

The following description generally relates to generation and analysis of electronic parameters. More specifically, the following description relates to electronically analyzing and normalizing a shipping parameter based on user preference data.

BACKGROUND

During shipping operations, customers may communicate with various shipping companies to request a price quote or estimated price quote for shipping services. Each shipping company may provide a price quote in a format that is standard for that particular shipping company. But, this may require a customer to devote a considerable amount of time to aggregating the various price quotes from the various shipping companies and manually comparing the price quotes. Further, each shipping company may use a particular software to provide a price quote in a particular format and the customer may use a different software that is unable to process a particular shipping company's price quote format. This may require the customer to manually analyze the various price quotes in order to compare the quotes. What is needed is a faster, cheaper, and more efficient way to perform some such shipping-related computer tasks.

SUMMARY

Various embodiments of the present disclosure provide systems and methods for automatically analyzing and normalizing a shipping parameter based on user preference data.

In one embodiment, a system for electronically analyzing and normalizing a shipping parameter based on user preference data comprises: a computing device including a processing device and a memory device in which instructions executable by the processing device are stored for causing the processing device to: receive a first data set indicating a request for a shipping cost and user preference data; receive a second data set indicating a first shipping cost based on the request; determine a second shipping cost based on the first shipping cost and the user preference data by modifying the first shipping cost based on the user preference data; and generate a user interface for outputting the second shipping cost.

In another embodiment, a method for electronically analyzing and normalizing a shipping parameter based on user preference data comprises: receiving a first data set indicating a request for a shipping cost and user preference data indicating a particular shipping cost format; receiving a second data set indicating a first shipping cost based on the request; determining a second shipping cost based on the first shipping cost and the user preference data by modifying the first shipping cost to correspond to the particular shipping cost format; and generating a user interface for outputting the second shipping cost.

In another embodiment, a system for electronically analyzing and normalizing a shipping parameter based on user preference data comprises: a computing device including a processing device and a memory device in which instructions executable by the processing device are stored for causing the processing device to: receive a first data set indicating a request for a shipping cost, a parameter associated with a good, and user preference data indicating a particular shipping cost format; receive a second data set indicating a first shipping cost based on the request; determine a second shipping cost based on the first shipping cost, the parameter associated with the good, and the user preference data by modifying the first shipping cost to correspond to the particular shipping cost format based on the parameter; and generate a user interface for outputting the second shipping cost.

In yet another embodiment, a method of the present disclosure may comprise receiving a signal over a network from a first computing device, the signal specifying a preferred format in which to receive a data value from a second computing device; selecting one or more input fields for an interactive form based on the preferred format specified in the signal; generating program code for the interactive form, the program code being configured to cause the interactive form to include the selected one or more input fields; providing the program code over the network to the second computing device, the second computing device being configured to receive the program code and responsively generate the interactive form; receiving, over the network and from the second computing device, one or more data items via the one or more input fields of the interactive form; converting the one or more data items into the data value in the preferred format; and providing the data value over the network to the first computing device. The method may be implemented by a server in some examples.

Another embodiment of the present disclosure may involve a non-transitory computer-readable medium comprising program code that is executable by a processor for causing the processor to implement any of the methods described above or elsewhere herein.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF DRAWINGS

A full and enabling disclosure is set forth more particularly in the remainder of the specification. The specification makes reference to the following appended figures.

DETAILED DESCRIPTION

Figure 1:
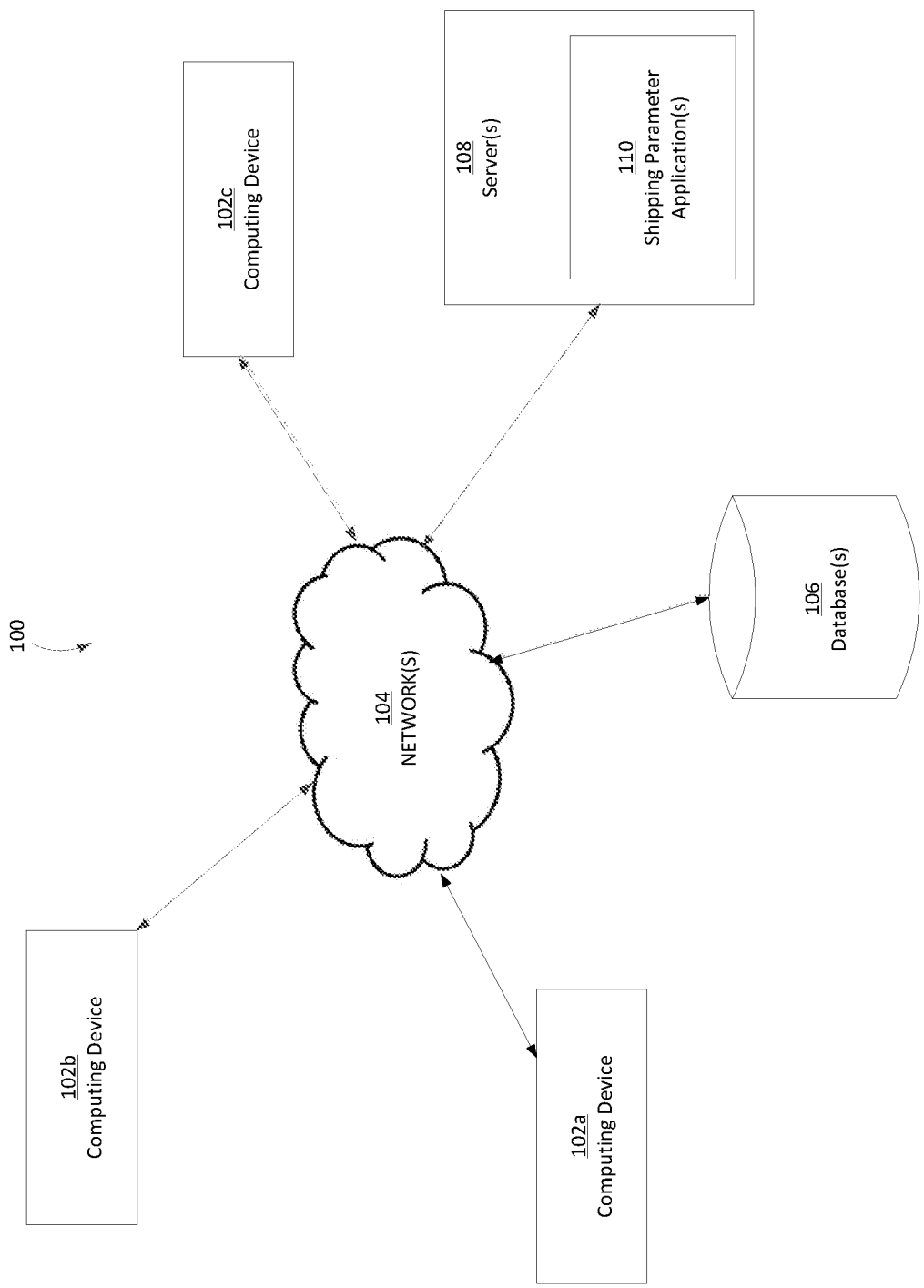
FIG. 1 shows an example of an environment for automatically analyzing and normalizing a shipping parameter based on user preference data according to some aspects.

Reference will now be made in detail to various and alternative illustrative embodiments and to the accompanying drawings. Each example is provided by way of explanation and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Examples

One illustrative embodiment of the present disclosure comprises a server configured to provide an online portal, such as a website-based portal, that can serve as an intermediary between a requestor and a recipient to enable the parties to communicate with one another. The requestor may be a sender of goods and the recipient may be a shipping entity for transporting the goods. In this example, the requestor can operate a first computing device to submit a request for a price quote for shipping the goods via the online portal, where the price quote is to be provided in a preferred format of the requestor. For example, the requestor can submit a request for an "all in" price quote to be provided on a preferred basis (e.g., a cost by weight, such as cost per kilogram or cost per pound) and/or in a preferred currency (e.g., USD), where the "all in" price quote is a single numerical value that takes into account a variety of underlying factors. The request can include various information about the goods to be shipped, such their type, weight, dimensions, etc.

After the request has been submitted, the recipient can receive the request via the online portal at a second computing device. The online portal can also provide the recipient with one or more input capabilities tailored to the requestor's preferred format to enable the recipient to provide a suitable response. For instance, the server associated with the online portal can select one or more input fields (e.g., text-input boxes) for inclusion in an interactive form, based on the requestor's preferred format. In this way, the interactive form can be dynamically generated based on the requestor's preferred format. One example of the interactive form can enable the recipient to input various line-item costs on, for example a per-kilogram basis, if that was the requestor's preference. Examples of such line-item costs may include a base cost per kilogram, a fuel cost per kilogram, a pickup cost per kilogram, a security cost per kilogram, docs costs, a delivery cost per kilogram, or any combination of these. The server can then provide the interactive form with the selected one or more input fields to the recipient through the online portal. For example, the server can generate program code (e.g., HTML code, Javascript code, CSS code, and/or other web site code) for the interactive form and provide the program code to the second computing device of the recipient, such as to a website browser on the second computing device, via the online portal. After receiving the interactive form, the recipient can provide the necessary inputs into the interactive form and operate the second computing device to submit the inputs to the server via the online portal. The server can receive these inputs from the recipient and use them to generate a price quote in the requestor's preferred format, e.g., based at least in part on the information in the request about the goods to be shipped. For example, the server can convert the line-item costs into an "all in" price quote provided on a per kilogram basis in USD currency, if that was the requestor's preference. After generating the price quote in the requestor's preferred format, the online portal may provide the price quote back to the second computing device of the recipient for approval. If the recipient approves of the price quote generated by the server, the online portal can then provide the price quote back to the first computing device of the original requestor for further consideration.

In another illustrative example, a computing device (e.g., a server) can receive a request for a shipping price quote and user preference data from a requestor (e.g., a sender of goods). The request can include data about a good to be shipped. For example, the request can include a dimension, size, unit, or weight of the good. The user preference data can include a user preference provided by the sender of the goods. An example of the user preference can include a desired format of the shipping cost (e.g., rate). For example, the user preference data can indicate that the sender of the goods prefers that the shipping cost be provided based on a weight of the goods to be shipped (e.g., on a per pound or a per kilogram basis). The computing device can receive a first response to the request from a first shipping entity, where the response includes a first shipping price quote. The first shipping price quote can be associated with the transport of goods from a sender of the goods to a recipient of the goods by the first shipping entity. The first shipping price quote can include a total shipping cost for the transport of the goods, which can include a base cost and/or various additional shipping fees. The computing device can generate a second shipping price quote by converting the first shipping price quote to the second shipping price quote in accordance with the user preference data. For example, the computing device can determine a cost per pound (or a cost per kilogram) for transporting the goods based on the user preference data by, for example, dividing the total shipping cost by the amount of pounds (or kilograms) to be shipped.

In some examples, the computing device can also receive one or more additional responses to the request for the shipping price quote from one or more additional shipping entities. The computing device can then convert the shipping price quote in each of the responses from their existing format into another format in accordance with the user preference data (e.g., in substantially the same manner as described above), so that all of the shipping price quotes are provided back to the requestor in the same, normalized format. The computing device provides the normalized shipping price quotes to the requestor in a user interface, for example, as part of an online portal that is accessible to the requestor and the shipping entities. In some examples, the computing device can further compare the various shipping price quotes to one another in order to identify an optimal shipping price quote and a shipping entity associated with the optimal shipping price quote. For example, the computing device can compare the various normalized shipping price quotes and identify the cheapest shipping cost per pound (or per kilogram) and identify a shipping entity associated with the cheapest shipping cost. In this example, the computing device can output the identified optimal shipping price quote and the associated shipping entity via the user interface.

In yet another illustrative embodiment, a user can request a price quote for shipping goods using a computing device. In this example, the user provides the request, along with data about the goods (e.g., a size or weight of the goods), and user input indicating a desired format for the price quote such as, a cost per pound for shipping the goods. The computing device transmits a signal comprising data associated with the request and the desired price quote format to a server. The server receives the signal, and requests data indicating a price quote from a shipping entity (e.g., from a remote computing device accessible via a network) in response to the request. The shipping entity can respond by providing the price quote back to the server. The price quote can include a base cost and/or various additional shipping fees. The server can automatically generate another price quote based on the received price quote by converting the received price quote to correspond to the desired format requested by the user. For example, the server converts the total shipping cost to a cost per kilogram. In this example, the server can transmit a signal indicating the converted price quote back to the computing device, which can output the converted price via a display to the user.

In another embodiment, a user can input a request for a price quote for shipping goods to a computing device. The request can include data about the goods (e.g., a size or weight of the goods) and a desired format for the price quote, such as a cost per kilogram for shipping the goods. The computing device can transmit the request and the desired price quote format to another computing device of a shipping entity. The shipping entity can receive the request via the computing device and provide the price quote and the desired format to a server. The price quote received by the server can include a total shipping cost for the transport of the goods, which can be the sum of a base cost and various additional shipping fees. The server can automatically generate another price quote based on the received price quote by converting the received price quote to correspond to the desired format requested by the user. For example, the server can convert the total shipping cost to a cost per kilogram. In this example, the server can then provide the converted price quote to the user's computing device, which can output the converted price via a display to the user.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Exemplary Systems and Methods for Electronically Analyzing and Normalizing a Shipping Parameter Based on User Preference Data Conventionally, a company may submit a request for a shipping price estimate for a good and various carriers can submit a shipping price estimate in response to the request. However, each carrier may submit a shipping price estimate in a format that is standard for that particular carrier. This may require the company to devote a considerable amount of time to aggregating the various price estimates and manually comparing the price estimates. Further, each carrier may run their own software to provide a price estimate and the software may not take into account a format desired by the company.

Some embodiments described herein may overcome one or more of the abovementioned problems by providing a software application capable of automatically analyzing and normalizing shipping parameters (e.g., shipping costs) from one or more shipping entities based on user preference data provided by another entity (e.g., a supplier or provider of goods). The shipping parameters can relate to ocean freight, air freight, land freight, or any combination of these. The application can be accessed through an Internet-based web portal generated using one or more underlying servers which receive information, analyze the information, and normalize the information.

One particular example can include a web-based program hosted by a web server. The web-based program can provide a populated shipment record. The shipment record can provide a repository useful for analyzing and normalizing shipment parameters (e.g., analyzing and normalizing shipping costs provided by shipping entities). An authorized user may access the shipment record through a network, such as the Internet, in order to obtain current information relating to a shipment. The user can also submit a request via the web-based program for a shipping parameter. The request may take into account (e.g., include) at least some of the information in the shipment record. The web-based program can collect responses to the request from various shipping entities, normalize the responses in accordance with a user preference, and provide the responses in their normalized format back to the user.

In the above example, the web server can respond to Hypertext Transfer Protocol (HTTP) requests by executing code. The web server may be a single computer system, or may be implemented as a network of computer processors. Examples of web servers are mainframe computers, networked computers, a processor-based device, and similar types of systems and devices. The web server can comprise a processor, which, in turn, can be in communication with a computer-readable medium. The processor comprises a computer-readable medium, such as a random access memory (RAM) coupled to the processor. The processor executes computer-executable program instructions stored in memory, such as executing one or more computer programs for generating a record. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other forms of computer-readable media may transmit or carry instructions to a computer, such as a router, private or public network, or other transmission device or channel. The instructions may comprise code from any suitable computer-programming language, including, for example, .NET, C, C++, C#, Visual Basic, Java, Python, Perl, and JavaScript. The processor, and the processing, described may be in one or more structures, and may be dispersed through one or more structures. The processor may comprise code for carrying out one or more of the methods (or parts of methods) described herein. The processor may be in communication with any number of other external or internal devices such as a mouse, a CD-ROM, a keyboard, a display, or other input or output devices.

The web server may be in communication with a network, such as the Internet. Accordingly, a user may access the shipment record and submit the request to the web server over the Internet. For example, a user may access the web portal, by entering a user identifier and a password, and from there be able to submit the request and/or view responses to the request. The web portal may be accessible through a browser, such as Microsoft's Internet Explorer™, or Mozilla's Firefox™.

Turning now to FIG. 1, FIG. 1 shows an embodiment of an exemplary environment 100 for automatically analyzing and normalizing a shipping parameter based on user preference data. Any embodiment or combination of embodiments described herein may be implemented using any component (e.g., computing device 102a-c or server 108) or combination of components (e.g., computing device 102a-c, server 108, and a database 106) shown in FIG. 1.

The environment 100 may include one or more computing devices 102a-c. In some embodiments, the computing devices 102a-c may comprise a mobile device (e.g., smart phone), a laptop computer, a desktop computer, a server, and/or any other computing device. In some embodiments, the computing devices 102a-c may be associated with one or more entities. For example, the computing device 102a may be associated with a shipping company used to transport goods and the computing device 102b may be associated with a provider or supplier of the goods. The environment 100 may include any number, arrangement, and configuration of computing devices 102 associated with any number, arrangement, and configuration of entities. An example of a computing device 102a-c (or server 108) is described with respect to FIG. 3.

The environment 100 may comprise one or more servers 108. The server(s) 108 may comprise a mobile device (e.g., smart phone), a laptop computer, a desktop computer, and/or any other computing device. In some embodiments, the server(s) 108 may comprise a cloud server, a webserver, etc. For example, the server(s) 108 may comprise a cloud server configured to execute one or more shipping parameter applications 110 (e.g., cloud applications) for performing any of the methods described herein. In some embodiments, one or more entities may use one or more computing devices 102a-c to execute the shipping parameter application(s) 110 via server(s) 108. The shipping parameter application(s) 110 may include instructions for causing the server 108 or the computing devices 102a-c to analyze and/or normalize a shipping parameter based on user preference data.

In some embodiments, the server(s) 108 can receive data (e.g., via network 104) from one or more computing devices 102a-c, execute the shipping parameter application(s) 110, and/or provide results from the shipping parameter application(s) 110 to one or more computing devices 102a-c. In some embodiments, execution of the shipping parameter application(s) 110 and/or processing can be distributed or split among multiple processors or servers 108. For example, two or more servers 108 may execute portions of a single shipping parameter application 110 in parallel. As another example, two or more servers 108 may execute the same application or different shipping parameter applications 110 in parallel. This may enhance the speed and/or accuracy of the environment 100.

In some embodiments, one or more server(s) 108 are configured to receive one or more data sets from any combination of the computing devices 102a-c and database(s) 106. For example, the server(s) 108 may receive a first data set from computing device 102a and/or a second data set from a database 106. As another example, the server(s) 108 may receive a first data set from computing device 102a and/or a second data set from the computing device 102b. As still another example, the server(s) 108 may receive a first data set and a second data set from the database(s) 106. In some embodiments, the one or more server(s) 108 can analyze the one or more data sets received or obtained from the computing devices 102a-c and/or the database 106 to normalize a shipping parameter based on user preference data.

For example, the server 108 can obtain (e.g., receive) a data set from the computing device 102a. The data set can indicate a request for a shipping cost (e.g., an estimated shipping cost) for the shipment of a good. In some embodiments, the data set can also include data about a good to be shipped. For example, the data set can include data about shipment volume, shipment quantity, shipment weight, shipment dimensions, container identification information, container size, quantity of containers, carton quantity, carton identification information, carton contents, etc. The data set can also include user preference data. For example, the computing device 102a can be associated with a provider (e.g., supplier) of goods and the user preference data can indicate a desired format for receiving a shipping cost or estimated shipping cost. As an example, the user preference can indicate that the provider of the goods prefers that the shipping cost be provided based on the shipment weight (e.g., on a per pound or a per kilogram basis).

The server 108 can also obtain responses to the request from the computing device(s) 102b-c, where the responses comprise additional data sets. For example, the server 108 can forward the request from the computing device 102a to the computing device(s) 102b-c, which can be associated with shipping companies. The shipping companies can transmit responses back to the server 108 via the computing devices 102b-c. The responses may each comprise a data set that includes a total shipping cost for the transport of the goods, which can be provided along with a breakdown of the various fees that yield the total, such as a base cost and various additional fees. But this format may be undesirable to a user of the computing device 102a. So, the server can automatically analyze and normalize the responses provided by computing device 102b-c so that they comply with the user preference data, and provide the normalized responses back to computing device 102a.

In some examples, the server 108 can automatically analyze and normalize a shipping parameter based on data received from the computing devices 102a-c, the database 106, user input, etc. For example, the server 108 can analyze the user preference data and the data indicating a total shipping cost for the transport of the goods and determine another shipping cost by normalizing the total shipping cost based on the user preference data. For example, the server 108 can normalize the total shipping cost by dividing the total shipping cost by the shipment weight such as, for example, an amount of pounds or kilograms of the goods, to determine a cost per pound (or a cost per kilogram) in accordance with the user preference data.

The server 108 can generate one or more user interfaces for outputting data via a display. For example, the server 108 can generate a user interface (e.g., a graphical user interface) for outputting a shipping cost determined by the server 108 by normalizing a total shipping cost based on user preference data. As an example, the server 108 generates a user interface for outputting data indicating the determined shipping cost per pound or per kilogram. In another example, the server 108 can transmit data indicating a shipping cost determined by normalizing a total shipping cost based on user preference data to the computing devices 102a-c via the network 104, and the computing device 102a-c can generate a user interface for outputting the shipping cost. For example, the server 108 transmits data to the computing device 102a indicating the determined shipping cost per pound or per kilogram and the computing device 102a generates a user interface for outputting the shipping cost per pound (or per kilogram).

In some embodiments, the server 108 can store data obtained or received from the computing devices 102a-c or data generated by the server 108 in the database 106.

While in some examples the server 108 can determine a shipping cost based on the shipment weight and generate a user interface indicating the determined shipping cost, the present disclosure is not limited to such configurations. Rather, in other examples, the server 108 determines a shipping cost based on any user preference data. For example, the user preference data may indicate that the provider of the goods prefers that the shipping cost be provided based on shipment volume, shipment quantity, shipment weight, shipment dimensions, container identification information, container size, quantity of containers, carton quantity, carton identification information, carton contents, etc., and the server 108 determines a shipping cost based on the user preference data in substantially the same manner as described above. In another example, the user preference data may indicate that the sender or supplier of the goods prefers that the shipping cost be provided based on a total shipping cost (e.g., as provided by a shipping company). In this example, the server 108 may not manipulate (e.g., normalize) the total shipping cost and can generate a user interface for outputting the total shipping cost in its original format.

In another example, the computing device 102b-c can receive data from the computing device 102a indicating a request for a price quote for shipping goods, along with data about the goods (e.g., a size or weight of the goods) and data indicating a desired format for the price quote such as, a cost per pound for shipping the goods. The computing device 102b-c can transmit data indicating a price quote and the desired format for the price quote to the server 108 in response to receiving the request. In this example, the server 108 can automatically analyze and normalize a shipping parameter based on data received from the computing device 102b-c. For instance, the price quote received by the server 108 can include a total shipping cost for the transport of the goods, which can include a base cost and/or various additional shipping fees. The server 108 can automatically generate another price quote based on the received price quote by converting the received price quote to correspond to the desired format requested by the user. For example, the server 108 converts the total shipping cost to a cost per pound. In this example, the server 108 can transmit a signal indicating the converted price quote to the computing device 102a and the computing device 102a can output the converted price via a display.

The environment 100 may comprise one or more databases 106. In some embodiments, one or more computing devices 102a-c and/or servers 108 can query the database(s) 106 to obtain data (e.g., for use in automatically analyzing and normalizing a shipping parameter based on user preference data). For example, the database 106 may receive and store a first data set provided by, e.g., the computing device 102a. The first data set may include a request for a shipping cost or an estimated shipping cost, data about a good to be shipped, and/or data about a user preference. The database 106 may additionally or alternatively receive and store a second data set provided by, e.g., the computing device 102b. The second data set can include a shipping cost or an estimated shipping cost (e.g., an estimated cost in response to the request for the shipping cost or the estimated shipping cost from the computing device 102a). In some embodiments, one or more computing devices 102a-c and/or servers 108 may use data stored in the database(s) 106, e.g., to automatically analyze and normalize a shipping parameter based on user preference data.

The computing devices 102a-c, server(s) 108, and/or database(s) 106 may be connected to, and communicate via, a network 104. The network 104 may be any suitable number or type of networks or links, including, but not limited to, a dial-up network, a local area network (LAN), wide area network (WAN), public switched telephone network (PSTN), a cellular network, a WiFi network, the Internet, an intranet or any combination of hard-wired and/or wireless communication links. In some embodiments, the network 104 is a single network. In other embodiments, the network 104 may comprise two or more networks.

Although the exemplary environment 100 of FIG. 1 is depicted as having a certain number of components, other examples can include more, fewer, or different components than those shown in FIG. 1. Further, while FIG. 1 illustrates a particular arrangement of the computing devices 102a-c, server(s) 108, and database 106, various additional arrangements are possible. As an example, while FIG. 1 illustrates the computing devices 102a-c, server 108, and the database 106 as part of separate systems, in some embodiments, the database 106, the server 108, and the computing devices 102a-c are part of a single system.

Figure 2:
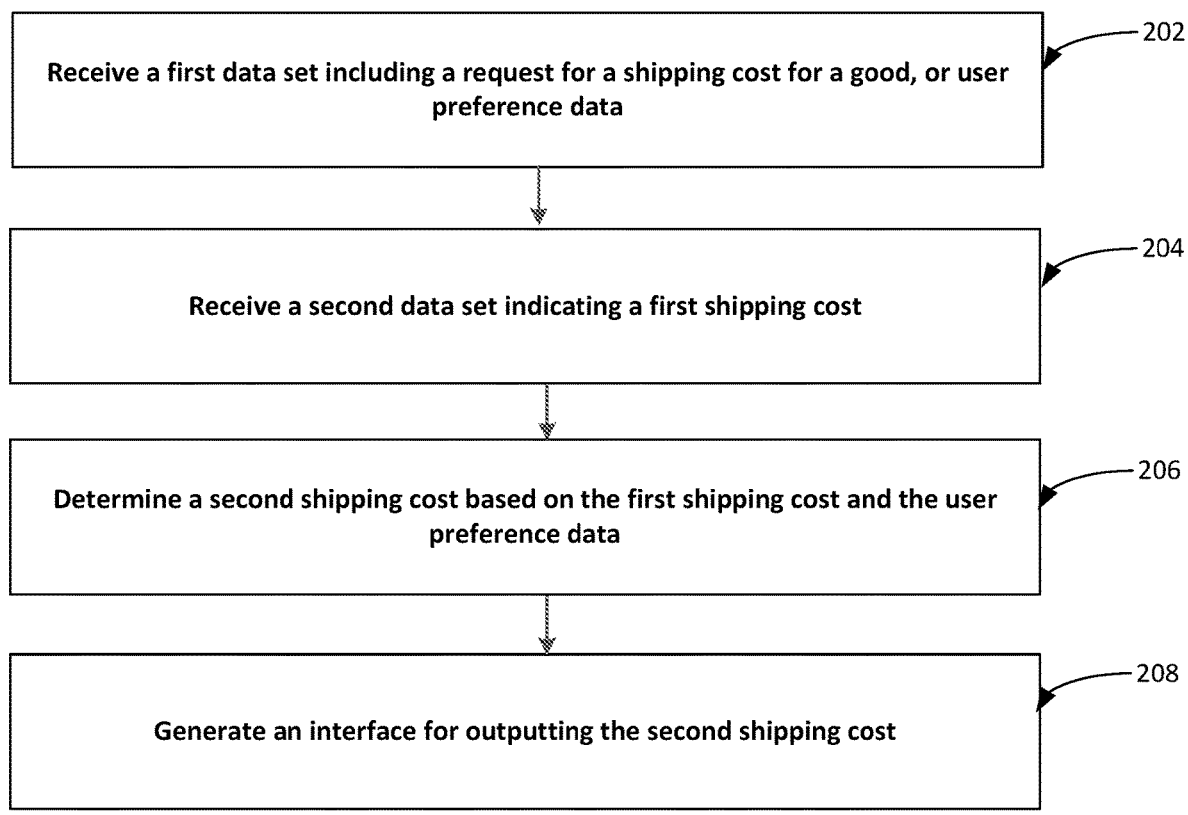
FIG. 2 shows a flowchart of an example of a process for automatically analyzing and normalizing a shipping parameter based on user preference data according to some aspects.

FIG. 2 shows a flowchart of steps for performing a method for automatically analyzing and normalizing a shipping parameter based on user preference data according to one embodiment. In some embodiments, the steps in FIG. 2 may be implemented in program code that is executed by a processor, for example, the processor in a general purpose computer, a mobile device, or a server. In some embodiments, these steps may be implemented by a group of processors. In some embodiments, one or more steps shown in FIG. 2 may be omitted or performed in a different order. Similarly, in some embodiments, additional steps not shown in FIG. 2 may also be performed. Further, for simplicity, the steps below are described with reference to components described above with regard to the environment 100 of FIG. 1, but other implementations are possible.

The method begins at step 202 when a server 108 receives a first data set. The server 108 can receive the first data set from a remote computing device, other server, database, a local memory, user input, or any combination of these. For example, the server 108 can receive the first data set from a computing device 102a. The first data set may include a request for a shipping cost quote for shipping goods (e.g., from a sender or provider of goods), data about a good to be shipped, and/or user preference data. In some embodiments, user preference data may include a particular format for receiving the shipping cost quote. For example, a user of the computing device 102a (e.g., a sender or provider of goods) may provide user preference data that indicates that the user prefers to receive a shipment cost quote or estimate based on the shipment weight (e.g., on a per pound or a per kilogram basis).

In some embodiments, the server 108 determines data from the first data set for use in automatically analyzing and normalizing a shipping parameter based on user preference data. For example, the server 108 may extract supplier information (e.g., a name of a sender or provider company, or a supplier location), an amount of the goods being shipped (e.g., by weight, units, volume, or other metric), a type of the goods being shipped, a number of containers holding the goods being shipped, and/or other information from the first data set.

The method continues at step 204 when the server 108 receives a second data set indicating a first shipping cost. The server 108 can receive the second data set from a remote computing device, server, database, a local memory, user input, or any combination of these. For example, the server 108 can receive the first data set from the computing device 102b. In some embodiments, the second data set can include a total shipping cost for transporting the goods by a shipping entity associated with computing device 102b. The second data set can include the total shipping cost by itself, or can include the total shipping cost along with a line-item breakdown of various fees that yield the total, such as a base cost (e.g., a standard rate) and various additional fees.

In some embodiments, the server 108 receives the second data set in response to receiving a request for a shipping cost (e.g., in step 202). For example, the server 108 can receive the request for the shipping cost (e.g., in step 202) and transmit a signal to the computing device 102b indicating the request for the shipping cost. In some examples, the computing device 102b can be associated with a shipping company and the shipping company can transmit the second data set to the server 108 in response to receiving the signal.

The method continues at step 206 when the server 108 determines a second shipping cost based on the first shipping cost and the user preference data. For example, the server can determine a second shipping cost by normalizing the first shipping cost using the user preference data.

For example, the server 108 can analyze the user preference data and the data indicating a total shipping cost for the transport of the goods and determine a second shipping cost by normalizing the total shipping cost based on the user preference data. As an example, the user preference data indicates that the user prefers to receive a shipment cost quote based on the shipment weight (e.g., on a per pound or a per kilogram basis). In this example, the server 108 can normalize the total shipping cost by dividing the total shipping cost by the shipment weight such as, for example, the amount of pounds or kilograms of the goods, to determine a cost per pound or a cost per kilogram in accordance with the user preference data.

In some embodiments, the server 108 can receive a plurality of shipping costs from a plurality of shipping entities in response to a request for a shipping cost (e.g., in step 204). In this example, the server 108 can determine a plurality of additional shipping costs based on the received shipping costs and the user preference data in substantially the same manner as described above. For example, the server 108 can receive a request for the shipping cost (e.g., in step 202) and transmit a signal to the computing devices 102b and 102c indicating the request for the shipping cost (e.g., a request for a shipping cost quote). In this example, the computing devices 102b and 102 can each be associated with a shipping company and each shipping company can transmit data indicating a total shipping cost for the transport of the goods to the server 108 in response to receiving the signal. The server 108 can normalize the total shipping cost provided via each computing device 102b-c based on user preference data (e.g., by dividing the total shipping cost by the shipment weight to determine a cost per pound or a cost per kilogram in accordance with the user preference data). In some embodiments, the server 108 can compare the normalized total shipping for each shipping company associated with computing devices 102b-c to determine an optimal shipping cost and identify the shipping company associated with the optimal shipping cost. For example, the server 108 can compare the cost per pound for shipping goods using the shipment company associated with the computing device 102b to the cost per pound for shipping goods using the shipment company associated with the computing device 102c to identify the lowest or cheapest cost per pound for shipping the goods. In this example, the server can identify the cheapest cost per pound for shipping the goods and identify the shipping company associated with the identified cost.

The method continues at step 208 when the server 108 generates an interface for outputting the second shipping cost (e.g., the second cost determined in step 206). For example, the server 108 can generate a graphical user interface for outputting a shipping cost determined by the server 108 by normalizing a total shipping cost based on user preference data. As an example, the server 108 generates graphical user interface indicating the determined shipping cost per pound (or per kilogram) for shipping goods using the shipment company associated with the computing device 102b.

The server 108 can transmit data to the computing devices 102a-c via the network 104 and the computing device 102a-c can generate a user interface for outputting a shipping cost determined by the server 108. For example, the server 108 transmits data to the computing device 102a indicating the determined shipping cost per pound or per kilogram and the computing device 102a generates a user interface for outputting the shipping cost per pound or per kilogram.

In some embodiments, the server 108 can determine an optimal shipping cost and identify a shipping company associated with the optimal shipping cost as described above. In this example, the server 108 can generate a user interface for outputting the optimal shipping cost and associated shipping company.

Figure 3:
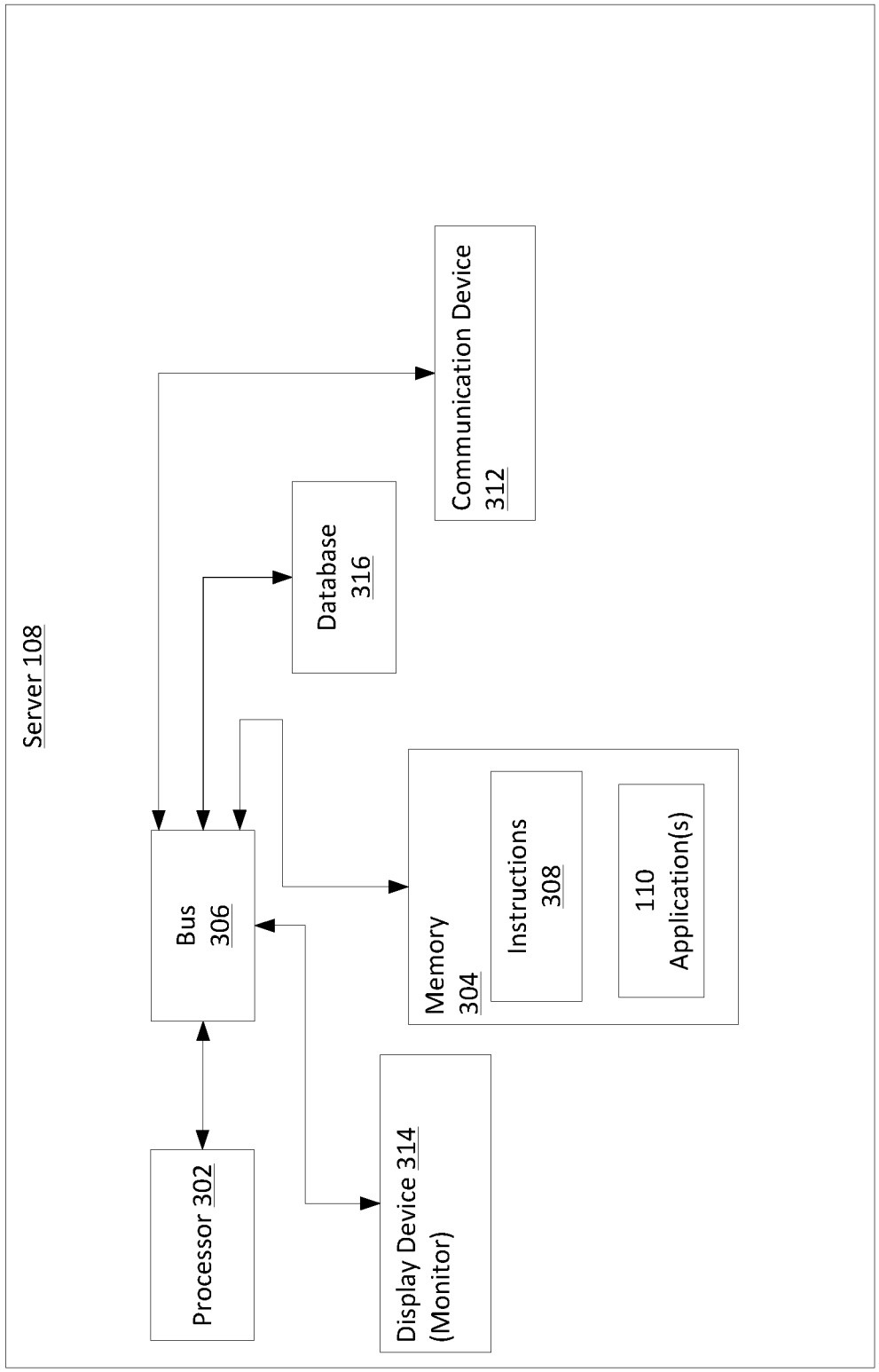
FIG. 3 is a block diagram of an example of a computing device for automatically analyzing and normalizing a shipping parameter based on user preference data according to some aspects.

FIG. 3 is a block diagram showing an embodiment of a computing device (e.g., the server 108 or the computing device 102 of FIG. 1) for automatically analyzing and normalizing a shipping parameter based on user preference data according to one embodiment.

The server 108 can be used to automatically analyze and normalize a shipping parameter based on user preference data and generate an interface for outputting the normalized shipping parameter. The server 108 can include a processor 302, a memory 304, and a bus 306. The processor 302 can execute one or more operations for operating the server 108. The processor 302 can execute instructions 308 stored in the memory 304 to perform the operations. Non-limiting examples of the processor 302 include a Field-Programmable Gate Array ("FPGA"), an application-specific integrated circuit ("ASIC"), a microprocessor, etc.

The processor 302 can be communicatively coupled to the memory 304 via the bus 306. The memory 304 may include any type of memory device that retains stored information when powered off. Non-limiting examples of the memory 304 include electrically erasable and programmable read-only memory ("EEPROM"), flash memory, or any other type of non-volatile memory. In some examples, at least some of the memory 304 can include a computer-readable medium from which the processor 302 can read the instructions 308. The computer-readable medium can include electronic, optical, magnetic, or other storage devices capable of providing the processor 302 with computer-readable instructions or other program code. Non-limiting examples of a computer readable-medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the server 108 can include input/output interface components (e.g., a display device 310 and a communication device 312). The server 108 can also include other input/output interface components such as a keyboard, touch-sensitive surface, mouse, and additional storage.

The server 108 can receive data from a computing device (e.g., the computing devices 102a-c), a database (e.g., the database 106), or another server via the communication device 312. The server 108 can also receive data from a remote location via the communication device 312. In some examples, the communication device 312 can represent one or more of any components that facilitate a network connection. In some examples, the communication device 312 may be wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In another example, the communication device 312 can be wired and can include interfaces such as Ethernet, USB, IEEE 1394, a landline, or a fiber optic interface.

The processor 302 can include one processing device or multiple processing devices. The processor 302 can execute one or more operations for automatically analyzing and normalizing a shipping parameter based on user preference data. For example, the instructions 308 can cause the processor 302 to execute one or more operations for automatically analyzing and normalizing a shipping parameter based on user preference data (e.g., user preference data received from a computing device, database, user input, etc.). In another example, the processor 302 can execute one or more operations for analyzing and normalizing a shipping parameter based on user preference data and generating an interface for outputting the normalized shipping parameter.

In some embodiments, the server 108 executes program code that configures the processor 302 to perform one or more of the operations described above with respect to FIG. 2. The program code includes, for example, the shipping parameter application 110 or other suitable applications that perform one or more operations described herein. The program code may be resident in the memory 304 or any suitable computer-readable medium and may be executed by the processor 302 or any other suitable processor. In some embodiments, the program code described above is stored in the memory 304, as depicted in FIG. 3. In additional or alternative embodiments, the program code described above is stored in one or more memory devices accessible via a data network.

In some examples, the server 108 can also be communicatively coupled to the display device 314 via the bus 306. The display device 314 can display data that may correspond to data received by the server 108 (e.g., a first data set or a second data set received by the server 108). The display device 314 may also display data that may correspond to data generated by executing an operation executed by the processor 302.

The server 108 can also be communicatively coupled to a database 316 (e.g., the database 106) via the bus 306. The database 316 can store data that may correspond to data received by the server 108. The database 316 may also store data that may correspond to data generated by an operation executed by the processor 302. In still another example, the database 316 may store data that may correspond to data received by the server 108 from a remote location (e.g., from a computing device positioned at the remote location) or indicia of user input (e.g., if a user programs the server 1008 to include data). In some embodiments, the database 316 is stored on the server 108, as depicted in FIG. 3. In additional or alternative embodiments, the server 108 can access the database 316 accessible via a data network.

Figure 4:
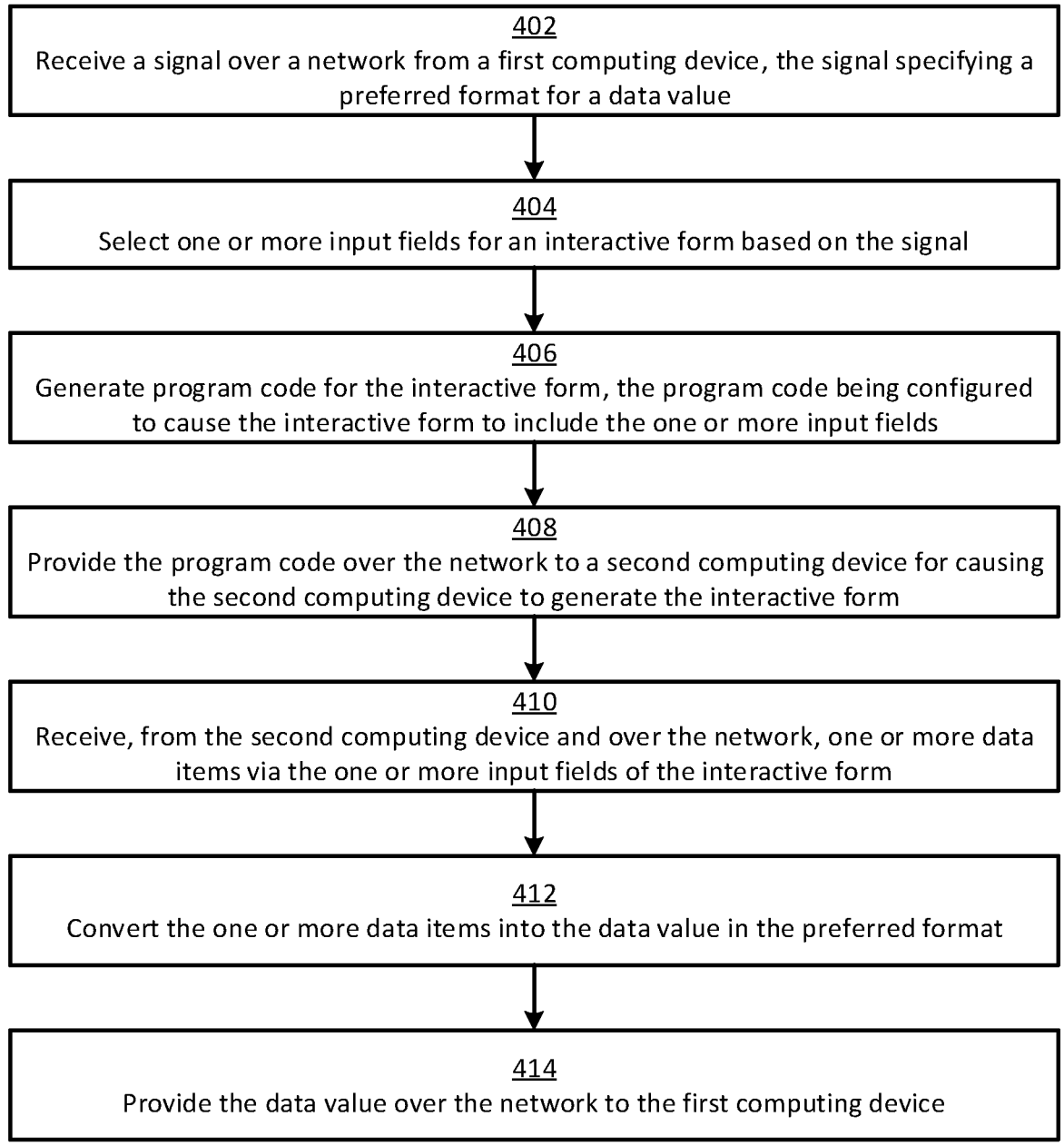
FIG. 4 is a flowchart of an example of a process for implementing some aspects of the present disclosure.

FIG. 4 shows a flowchart of steps for implementing some aspects of the present disclosure. In some embodiments, the steps in FIG. 4 may be implemented in program code that is executed by a processor, for example, the processor in a general purpose computer, a mobile device, or a server. In some embodiments, these steps may be implemented by a group of processors. In some embodiments, one or more steps shown in FIG. 4 may be omitted or performed in a different order. Similarly, in some embodiments, additional steps not shown in FIG. 4 may also be performed. Further, for simplicity, the steps below are described with reference to components described above with regard to the environment 100 of FIG. 1, but other implementations are possible.

In step 402, the server 108 receives a signal (e.g., an electronic signal) over a network 104 from a first computing device 102a. The signal can specify a preferred format in which to receive a data value (e.g., a price quote) from a second computing device 102b. In some examples, the signal may be a request provided from the first computing device 102a through a website browser to interact with a website hosted by the server. The request may be, for example, a hypertext transfer protocol (HTTP) request or an Ajax request. The website may serve as a web-based portal through which multiple entities, such as entities associated with the first and second computing devices 102a-b, can interact with one another.

In step 404, the server 108 selects one or more input fields for an interactive form based on signal. In some examples, the server 108 can select the one or more fields based the preferred format and/or a type of the data value (a "data-value type") specified in the signal. For example, the server 108 may access predefined mappings between (i) a plurality of format options for the data value and (ii) a plurality of input fields that can be included in the interactive form. The predefined mappings may be stored in database 106. In the predefined mappings, each format option in the plurality of format options can have one or more of the input fields assigned thereto. The server 108 can access the predefined mappings to determine which of input fields among the plurality of input fields to incorporate into the interactive form, based on the preferred format specified in the signal.

Additionally or alternatively, the server 108 may access predefined mappings between (i) a plurality of data-value types and (ii) a plurality of input fields that can be included in the interactive form. The predefined mappings may be stored in database 106. In the predefined mappings, each data-value type in the plurality of data-value types can have one or more of the input fields assigned thereto. The server 108 can access the predefined mappings to determine which of input fields among the plurality of input fields to incorporate into the interactive form, based on the data-value type specified in the signal.

In step 406, the server 108 generates program code for the interactive form. The program code is configured to cause the interactive form to include the one or more input fields selected in step 404. For example, the program code can include website code (e.g., HTML, Javascript, jQuery, and/or CSS code) configured to be provided to a website browser for rendering the interactive form within the context of a webpage. And the server 108 may generate the website code by populating the website code with predefined code segments associated with the one or more input fields. For example, the server 108 can access a datastore (e.g., a database or filesystem) storing the predefined code segments. Each of the predefined code segments may correspond to a different input field. The server 108 can determine which of the predefined code segments correspond to the one or more input fields (e.g., using predefined mappings), obtain the predefined code segments from the datastore, and incorporate the predefined code segments into the website code. Alternatively, the server 108 can execute preprogrammed conditional statements (e.g., IF-THEN-ELSE statements) to populate the website code with the predefined code segments. The server 108 can dynamically configure the website code to generate the interactive form with the one or more input fields.

In step 408, the server 108 transmits the program code over the network 104 to the second computing device 102b for causing the second computing device 102b to generate the interactive form. For instance, in an example in which the program code is website code, the second computing device 102b can receive the website code and responsively generate the interactive form within the context of a webpage in a website browser. A user of the second computing device 102b may then be able to interact with the interactive form via the website browser.

In step 410, the server 108 receives one or more data items via the one or more input fields of the interactive form (e.g., the dynamically generated, electronic form). The server 108 can receive the one or more data items over the network 104 from the second computing device 102b. Each data item may correspond to a user input provided into one of the input fields of the interactive form. In some examples, the data items may be received from the second computing device 102b in a format other than the preferred format.

In step 412, the server 108 converts the one or more data items into the data value in the preferred format. For example, the server 108 may add together numerical values of the one or more data items, and then convert the result into the preferred format, to generate the data value in the preferred format. The server 108 can use any number and combination of techniques described herein to generate the data value in the preferred format.

In step 414, the server 108 transmits the data value over the network 104 to the first computing device 102a. For example, the server 108 may provide the data value (in the preferred format) in a website to the first computing device 102a for rendering in a website browser thereof. In some such examples, the server 108 may dynamically populate the website's content with the data value, in response to an HTTP request from the web site browser executing on the first computing device 102a.

Additional Examples

In some embodiments, a method may comprise receiving a first data set indicating a request for a shipping cost and user preference data; receiving a second data set indicating a first shipping cost from a shipping entity in response to the request; determining a second shipping cost based on the user preference data and the first shipping cost by normalizing the first shipping cost using the user preference data; and generating a user interface for outputting the second shipping cost.

In some embodiments, the first data set and/or the second data set can comprise at least one of the following: carrier identification, shipment identification information, bill of lading identification information, purchase order identification information, purchase order location, shipping company identification, consignee identification, vessel identification, carrier identification, shipment origination information, shipment destination information, shipment date information, arrival date information, invoice identification information, shipment cost information, shipped item identification, shipped commodity information, shipment volume, shipment quantity, shipment weight, container identification information, container size, quantity of containers, carton quantity, carton identification information, and carton contents.

In some embodiments, the method further includes receiving a plurality of shipping costs from a plurality of shipping entities in response to the request and determining a plurality of other shipping costs from the received shipping costs by normalizing each shipping cost based on the user preference data. In some embodiments, the method may comprise comparing the plurality of other shipping costs to determine an optimal shipping cost among the plurality of other shipping costs and identifying a shipping entity associated with the optimal shipping cost. For example, the method can include comparing the plurality of generated shipping costs to identify the lowest or cheapest shipping cost per pound or per kilogram and identifying a shipping entity associated with the lowest or cheapest shipping cost. In this example, the method can further comprise outputting the optimal shipping cost and the associated shipping entity via the user interface.

In some embodiments, the present disclosure can provide systems and methods for electronically analyzing and normalizing shipping parameters. In some embodiments, systems and methods of the present disclosure can automatically normalize a shipping parameter based on user preference data before the user receives an invoice indicating the shipping parameter.

Although the present disclosure has been provided with reference to particular embodiments, it should be recognized that these embodiments are merely illustrative of the principles of the present disclosure. Those of ordinary skill in the art will appreciate that systems, methods, and computer readable media according to the present disclosure may be constructed and implemented in other ways and embodiments. Accordingly, the description herein should not be read as limiting, as other embodiments also fall within the scope of the present disclosure. Numerous modifications and adaptations thereof will be apparent to those skilled in the art without departing from the spirit and scope of this disclosure.

The invention claimed is:

1. A method performed by a server system of an intermediary entity, the method comprising:
   providing, by the server system of the intermediary entity, an online portal including a first webpage through which a requesting entity can request to receive a shipping quote from a shipping entity, the requesting entity being different from the intermediary entity and the shipping entity, and the intermediary entity being different from the shipping entity;
   receiving, by the server system of the intermediary entity, a user input from a first computing device of the requesting entity through the first webpage of the online portal, the user input being for initiating a process for receiving the shipping quote in a preferred format selected by the requesting entity;
   in response to receiving the user input, transmitting, by the server system of the intermediary entity, an electronic request for shipping cost data to a second computing device of the shipping entity;
   providing, by the server system of the intermediary entity, a second webpage of the online portal to the second computing device of the shipping entity for use in inputting the shipping cost data, the second webpage including an interactive form dynamically generated by the server system of the intermediary entity based on the preferred format selected by the requesting entity for the shipping quote;
   receiving, by the server system of the intermediary entity, the shipping cost data from the second computing device of the shipping entity through the interactive form in the online portal, the shipping cost data being input into the interactive form by the shipping entity in response to receiving the electronic request, and the shipping cost data being in another format that is different than the preferred format of the requesting entity;
   automatically converting, by the server system of the intermediary entity, the shipping cost data from the other format into the shipping quote in the preferred format of the requesting entity; and
   transmitting, by the server system of the intermediary entity, the shipping quote in the preferred format through the online portal to the first computing device of the requesting entity for display to the requesting entity.

2. The method of claim 1, further comprising, based on receiving the user input from the requesting entity:
   transmitting, by the server system of the intermediary entity, a plurality of electronic requests for the shipping cost data to a plurality of computing devices of a plurality of shipping entities;
   receiving, by the server system of the intermediary entity, a plurality of sets of shipping cost data from the plurality of computing devices of the shipping entities, the plurality of sets of shipping cost data being provided by the plurality of shipping entities in response to the plurality of electronic requests, and the plurality of sets of shipping cost data being provided in one or more other formats that are different than the preferred format of the requesting entity;
   automatically converting, by the server system of the intermediary entity, the plurality of sets of shipping cost data from the one or more other formats into a plurality of shipping quotes in the preferred format of the requesting entity; and
   transmitting, by the server system of the intermediary entity, the plurality of shipping quotes in the preferred format to the requesting entity via the online portal.

3. The method of claim 2, further comprising:
   comparing, by the server system of the intermediary entity, the plurality of shipping quotes in the preferred format to one another in order to determine an optimal shipping quote from among the plurality of shipping quotes;
   identifying, by the server system of the intermediary entity, a corresponding shipping entity associated with the optimal shipping quote from among the plurality of shipping entities; and
   transmitting, by the server system of the intermediary entity, information about the optimal shipping quote and the corresponding shipping entity to the requesting entity via the online portal.

4. The method of claim 1, wherein the server system of the intermediary entity includes one or more cloud applications executing on one or more cloud servers in a cloud-computing environment.

5. The method of claim 1, wherein the online portal is accessible to the first computing device and the second computing device via an Internet connection.

6. The method of claim 1, further comprising:
   selecting, by the server system of the intermediary entity, one or more input fields for the interactive form based on the preferred format selected by the requesting entity;
   dynamically generating, by the server system of the intermediary entity, program code for the interactive form, the program code being configured to cause the interactive form to include the selected one or more input fields;
   providing, by the server system of the intermediary entity, the program code to the second computing device, the second computing device being configured to receive the program code and responsively generate the interactive form; and
   receiving, by the server system of the intermediary entity and from the second computing device of the shipping entity, the shipping cost data via the one or more input fields of the interactive form.

7. The method of claim 6, further comprising automatically converting the shipping cost data from the other format into the shipping quote in the preferred format by:
   adding together numerical values in the shipping cost data to obtain a result; and
   converting the result into the preferred format by applying an algorithm to the result.

8. A system of an intermediary entity, the system comprising:
   a processor; and
   a memory in which instructions executable by the processor are stored for causing the processor to:
      provide, by the system of the intermediary entity, an online portal including a first webpage through which a requesting entity can request to receive a shipping quote from a shipping entity, the requesting entity being different from the intermediary entity and the shipping entity, and the intermediary entity being different from the shipping entity;
      receive, by the system of the intermediary entity, a user input from a first computing device of the requesting entity through the first webpage of the online portal, the user input being for initiating a process for receiving the shipping quote in a preferred format selected by the requesting entity;

in response to receiving the user input, transmit, by the system of the intermediary entity, an electronic request for shipping cost data to a second computing device of the shipping entity;

provide, by the system of the intermediary entity, a second webpage of the online portal to the second computing device of the shipping entity for use in inputting the shipping cost data, the second webpage including an interactive form dynamically generated by the system of the intermediary entity based on the preferred format selected by the requesting entity for the shipping quote;

receive, by the system of the intermediary entity, the shipping cost data from the second computing device of the shipping entity through the interactive form in the online portal, the shipping cost data being input into the interactive form by the shipping entity in response to receiving the electronic request, and the shipping cost data being in another format that is different than the preferred format of the requesting entity;

automatically, by the system of the intermediary entity, convert the shipping cost data from the other format into the shipping quote in the preferred format of the requesting entity; and transmit, by the system of the intermediary entity, the shipping quote in the preferred format through the online portal to the first computing device of the requesting entity for display to the requesting entity.

9. The system of claim 8, wherein the memory further includes instructions executable by the processor for causing the processor to:

transmit a plurality of electronic requests for the shipping cost data to a plurality of computing devices of a plurality of shipping entities;

receive a plurality of sets of shipping cost data from the plurality of computing devices of the shipping entities, the plurality of sets of shipping cost data being provided by the plurality of shipping entities in response to the plurality of electronic requests, and the plurality of sets of shipping cost data being provided in one or more other formats that are different than the preferred format of the requesting entity;

automatically convert the plurality of sets of shipping cost data from the one or more other formats into a plurality of shipping quotes in the preferred format of the requesting entity; and transmit the plurality of shipping quotes in the preferred format to the requesting entity via the online portal.

10. The system of claim 9, wherein the memory further includes instructions executable by the processor for causing the processor to:

compare the plurality of shipping quotes in the preferred format to one another in order to determine an optimal shipping quote from among the plurality of shipping quotes; and identify a corresponding shipping entity associated with the optimal shipping quote from among the plurality of shipping entities; and transmit information about the optimal shipping quote and the corresponding shipping entity to the requesting entity via the online portal.

11. The system of claim 10, wherein the processor and memory form parts of one or more cloud servers in a cloud-computing environment of the intermediary entity.

12. The system of claim 10, wherein the online portal is accessible to the first computing device and the second computing device via an Internet connection.

13. The system of claim 8, wherein the memory further includes instructions executable by the processor for causing the processor to:

select one or more input fields for the interactive form based on the preferred format selected by the requesting entity;

dynamically generate program code for the interactive form, the program code being configured to cause the interactive form to include the selected one or more input fields;

provide the program code to the second computing device, the second computing device being configured to receive the program code and responsively generate the interactive form; and receive, from the second computing device, the shipping cost data via the one or more input fields of the interactive form.

14. The system of claim 13, wherein the memory further includes instructions executable by the processor for causing the processor to automatically convert the shipping cost data from the other format into the shipping quote in the preferred format by:

adding together numerical values in the shipping cost data to obtain a result; and converting the result into the preferred format by applying an algorithm to the result.

15. A non-transitory computer-readable medium comprising instructions that are executable by a processing device of an intermediary system for causing the processing device to:

receive, by the intermediary system, a signal over a network from a first computing device, the signal specifying a preferred format in which to receive a data value from a second computing device, the first computing device and the second computing device being separate from each other and the intermediary system;

select, by the intermediary system, one or more input fields for an interactive form based on the preferred format provided by the first computing device;

dynamically generate, by the intermediary system, program code for the interactive form based on the selected one or more input fields;

transmit, by the intermediary system, the program code over the network to the second computing device, the second computing device being configured to generate the interactive form based on the program code;

receive, by the intermediary system over the network and from the second computing device, a set of data via the one or more input fields of the interactive form;

automatically convert, by the intermediary system, the set of data into the data value in the preferred format; and transmit, by the intermediary system, the data value in the preferred format over the network to the first computing device.

16. The non-transitory computer-readable medium of claim 15, wherein the data value includes a shipping quote, and wherein the preferred format is included in user preference data provided by the first computing device.

17. The non-transitory computer-readable medium of claim 16, wherein the first computing device is associated with a requesting entity, the second computing device is associated with a shipping entity that is different from the requesting entity, and the intermediary system is associated with an intermediary entity that is different from the requesting entity and the shipping entity.

18. The non-transitory computer-readable medium of claim 17, wherein the set of data includes shipping cost data in another format that is different from the preferred format, and further comprising instructions that are executable by the processing device for causing the processing device to automatically convert the shipping cost data from the other format into the shipping quote in the preferred format.

19. The non-transitory computer-readable medium of claim 18, further comprising instructions that are executable by the processing device for causing the processing device to:

provide an online portal including a first webpage through which the requesting entity can request to receive the shipping quote from the shipping entity;

providing a second webpage of the online portal to the shipping entity for use in inputting the shipping cost data, the second webpage including the interactive form dynamically generated by the intermediary system based on the preferred format selected by the requesting entity for the shipping quote; and transmit the shipping quote in the preferred format through the online portal to the first computing device of the requesting entity for display to the requesting entity.

20. The non-transitory computer-readable medium of claim 17, further comprising instructions that are executable by the processing device for causing the processing device to:

transmit a plurality of electronic requests for shipping cost data to a plurality of computing devices of a plurality of shipping entities;

receive a plurality of sets of shipping cost data from the plurality of computing devices of the shipping entities, the plurality of sets of shipping cost data being provided by the plurality of shipping entities in response to the plurality of electronic requests, and the plurality of sets of shipping cost data being provided in one or more other formats that are different than the preferred format of the requesting entity;

automatically convert the plurality of sets of shipping cost data from the one or more other formats into a plurality of shipping quotes in the preferred format of the requesting entity; and transmit the plurality of shipping quotes in the preferred format to the requesting entity.

* * * * *